US012293502B2

(12) United States Patent
Yang et al.

(10) Patent No.: US 12,293,502 B2
(45) Date of Patent: May 6, 2025

(54) IMAGE DEFECT DETECTION METHOD, ELECTRONIC DEVICE USING THE SAME

(71) Applicant: HON HAI PRECISION INDUSTRY CO., LTD., New Taipei (TW)

(72) Inventors: Jung-Hao Yang, New Taipei (TW); Chin-Pin Kuo, New Taipei (TW); Chih-Te Lu, New Taipei (TW); Tzu-Chen Lin, New Taipei (TW); Wan-Jhen Lee, New Taipei (TW); Wei-Chun Wang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 478 days.

(21) Appl. No.: 17/566,167

(22) Filed: Dec. 30, 2021

(65) Prior Publication Data

US 2022/0207707 A1 Jun. 30, 2022

(30) Foreign Application Priority Data

Dec. 30, 2020 (CN) .......................... 202011615847.2

(51) Int. Cl.
*G06K 9/00* (2022.01)
*G06N 3/045* (2023.01)
(Continued)

(52) U.S. Cl.
CPC .......... *G06T 7/0004* (2013.01); *G06N 3/045* (2023.01); *G06N 3/08* (2013.01); *G06T 5/00* (2013.01);
(Continued)

(58) Field of Classification Search
None
See application file for complete search history.

(56) References Cited

U.S. PATENT DOCUMENTS 10,387,716 B2 * 8/2019 Kim ..................... G06V 40/168
10,650,276 B1 * 5/2020 Florez Choque ...... G06N 3/084
(Continued)

FOREIGN PATENT DOCUMENTS

CN  109584225  4/2019
CN  111383209  7/2020
(Continued)

OTHER PUBLICATIONS

Vivek et al., "Plug-and-Pipeline: Efficient Regularization for Single-Step Adversarial Training," 2020 IEEE/CVF Conference on Computer Vision and Pattern Recognition Workshops (CVPRW), Seattle, WA, USA, 2020, pp. 138-146, doi: 10.1109/CVPRW50498.2020.00023. (Year: 2020).*

*Primary Examiner* — Feng Niu
(74) *Attorney, Agent, or Firm* — ScienBiziP, P.C.

(57) ABSTRACT

A method for detecting defects in products from images thereof and an electronic device applying the method inputs a defect image repair data set into an autoencoder to train the autoencoder, and generates a reconstructed image, calculates a reference error value between the sample image and the reconstructed image by a preset error function, and set a threshold value based on the reference error value. The electronic device inputs an image possibly revealing a defect into the autoencoder and generates the reconstructed image corresponding to the image to be detected, and uses the preset error function to calculate the reconstruction error between the image and the reconstructed image, thereby determining whether the image being analyzed does reveal defects. When the reconstruction error is greater than the threshold value, a determination is made that a defect is revealed.

8 Claims, 3 Drawing Sheets

(51) Int. Cl.
  *G06N 3/08* (2023.01)
  *G06T 5/00* (2006.01)
  *G06T 7/00* (2017.01)
(52) U.S. Cl.
  CPC ............... *G06T 2207/20076* (2013.01); *G06T 2207/20081* (2013.01); *G06T 2207/20084* (2013.01)

(56) References Cited

U.S. PATENT DOCUMENTS

| | | | | |
|---|---|---|---|---|
| 10,671,939 | B2* | 6/2020 | Knoll | G16H 30/40 |
| 10,817,741 | B2* | 10/2020 | Zhou | G06V 30/153 |
| 10,945,695 | B2* | 3/2021 | Zhou | A61B 6/5217 |
| 11,095,887 | B2* | 8/2021 | Kim | G06N 3/084 |
| 11,100,684 | B2* | 8/2021 | Hein | G06T 11/005 |
| 11,234,666 | B2* | 2/2022 | Chan | G06T 5/60 |
| 11,727,670 | B2* | 8/2023 | Hida | G06V 10/82 |
| 11,763,552 | B2* | 9/2023 | Lin | G06N 3/045 382/141 |
| 11,810,374 | B2* | 11/2023 | Wang | G06V 20/63 |
| 11,921,818 | B2* | 3/2024 | Kim | G06V 10/50 |
| 2017/0309019 | A1* | 10/2017 | Knoll | G06T 5/60 |
| 2018/0114057 | A1* | 4/2018 | Kim | G06V 40/175 |
| 2019/0019055 | A1* | 1/2019 | Zhou | G06T 7/10 |
| 2019/0130279 | A1* | 5/2019 | Beggel | G06V 10/82 |
| 2020/0196973 | A1* | 6/2020 | Zhou | G06N 3/045 |
| 2020/0364842 | A1* | 11/2020 | Chaton | G06T 7/001 |
| 2021/0012543 | A1* | 1/2021 | Hein | G06T 11/008 |
| 2021/0241032 | A1* | 8/2021 | Wang | G06V 30/153 |
| 2021/0374928 | A1* | 12/2021 | Hida | G06F 18/2148 |
| 2021/0390682 | A1* | 12/2021 | Lin | G06V 10/82 |
| 2022/0114725 | A1* | 4/2022 | Amthor | G06F 18/214 |
| 2022/0171999 | A1* | 6/2022 | Kim | H04N 1/6063 |
| 2022/0180520 | A1* | 6/2022 | Shang | G06T 7/248 |
| 2023/0090743 | A1* | 3/2023 | Pinto | G06F 18/22 382/141 |
| 2023/0186509 | A1* | 6/2023 | Ryan | G06T 5/50 382/103 |

FOREIGN PATENT DOCUMENTS

| | | | | |
|---|---|---|---|---|
| CN | 111833300 A | * | 10/2020 | ........... G06T 7/0004 |
| CN | 112070712 | | 12/2020 | |
| CN | 112085734 A | * | 12/2020 | ........... G06N 3/0454 |
| WO | WO-2019233166 A1 | * | 12/2019 | ........... G06T 7/0004 |
| WO | WO-2021155679 A1 | * | 8/2021 | ........... G06T 7/0014 |

* cited by examiner

IMAGE DEFECT DETECTION METHOD, ELECTRONIC DEVICE USING THE SAME

CROSS-REFERENCE TO RELATED APPLICATIONS

This application claims priority to Chinese Patent Application No. 202011615847.2 filed on Dec. 30, 2020, the contents of which are incorporated by reference herein.

FIELD

The subject matter herein generally relates to a field of image detection, and especially relates to an image defect detection method, and an electronic device.

BACKGROUND

In order to improve the quality of industrial products, defect detection is executed before the industrial product is packaged. However, the current defect detection method can have errors in the process of image reconstruction, resulting in the inability to detect products with subtle defects, so as to reduce the accuracy of defect detection.

BRIEF DESCRIPTION OF THE DRAWINGS

Implementations of the present disclosure will now be described, by way of embodiment, with reference to the attached figures.

DETAILED DESCRIPTION

Figure 1:
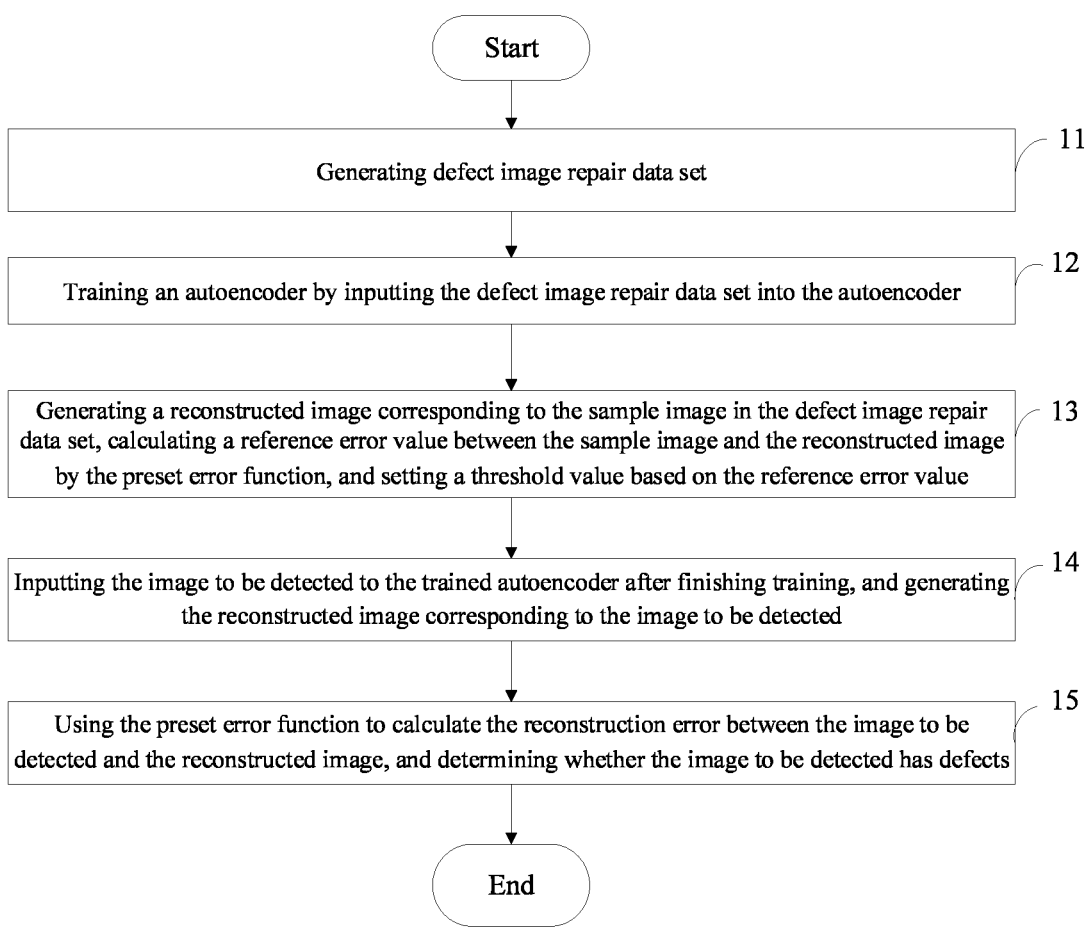
FIG. 1 is a flowchart of one embodiment of an image defect detection method.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

A method for detecting defects in products from images thereof is illustrated in the disclosure. The method is applied in one or more electronic devices. The electronic can automatically perform according to a number of preset or stored instructions. The hardware of the electronic device includes, but is not limited to a microprocessor, an Application Specific Integrated Circuit (ASIC), a Field Programmable Gate Array (FPGA), a Digital signal processor (DSP), or an embedded equipment, etc.

In one embodiment, the electronic device can be a desktop computer, a notebook computer, a tablet computer, a cloud server, or other computing device. The device can carry out a human-computer interaction with user by a keyboard, a mouse, a remote controller, a touch pad or a voice control device.

FIG. 1 illustrates the image defect detection method. The method is applied in the electronic device 6 (referring to FIG. 3). The method is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 11.

At block 11, generating defect image repair data set.

In one embodiment, the electronic device 6 establishes a data set of images of flawless product samples, adds a random block of defects generated by a preset method to a number of flawless sample images in the data set of images of flawless product samples to generate a number of artificial defect sample images, and generates the defect image repair data set based on pairs of the flawless sample images and the artificial defect sample images.

In one embodiment, the electronic device 6 extracts the defect block from a collected original defect sample image, and randomly rotates the defect block, randomly zooms the defect block, and adds random Gaussian noise to the defect block to generate the random defect block.

In a different embodiment, the flawless sample image and the original defect sample image can be obtained by different ways, for example, by photographing.

In another embodiment, generating the random defect block includes: generating a number of defect blocks having a random shape, a random position, a random size, a random gray value or a random quantity, randomly rotating the defect blocks, randomly zooming the defect blocks, and adding random Gaussian noise to the defect blocks to generate the random defect blocks.

At block 12, training an autoencoder by inputting the defect image repair data set into the autoencoder.

In one embodiment, training an autoencoder by inputting the defect image repair data set into the autoencoder: training the autoencoder to learn to reconstruct images of the defect image repair data set, using a preset error function as a loss function of the autoencoder, and minimizing the loss function to obtain the trained autoencoder.

In one embodiment, the autoencoder can be a denoising autoencoder, a sparse autoencoder, a compression autoencoder, a variational autoencoder, a stacking autoencoder, etc.

In one embodiment, the autoencoder includes an encoder and a decoder. In detail, the encoder includes at least one hidden layer, and the number of hidden layers can be arbitrarily set according to an application scenario of the autoencoder.

In one embodiment, training the autoencoder to learn the reconstructed images includes: training the autoencoder to learn to reconstruct the flawless sample image when the image input in the autoencoder is the flawless sample image; when the image input in the autoencoder is an artificial defect sample image, training the autoencoder to learn to reconstruct the flawless sample image corresponding to the artificial defect sample image.

In one embodiment, reconstructing the image input in the autoencoder includes: vectorizing the image to obtain a feature vector of the image, calculating the feature vector of the image by using a coding layer of the autoencoder to obtain a hidden vector of the image, using a decoding layer of the autoencoder to calculate the hidden vector of the image, and restoring the calculated hidden vector to obtain the reconstructed image corresponding to the image input into the autoencoder.

In one embodiment, minimizing the loss function of the autoencoder is the goal of optimizing the autoencoder.

In one embodiment, the loss function (namely the preset error function) can be a mean square deviation function or a cross entropy function.

In one embodiment, when the loss function is the mean square deviation function, optimizing the autoencoder includes: minimizing the mean square deviation of the reconstructed image of the image input into the autoencoder and minimizing the mean square deviation of the flawless sample image corresponding to the image input into the autoencoder.

In one embodiment, when the loss function is the cross entropy function, optimizing the autoencoder includes: minimizing the cross entropy between the reconstructed image of the image input in the autoencoder and the flawless sample image corresponding to the image input in the autoencoder.

At block 13, by the trained autoencoder, generating a reconstructed image corresponding to the sample image in the defect image repair data set, calculating a reference error value between the sample image and the reconstructed image by the preset error function, and setting a threshold value based on the reference error value.

In one embodiment, a preset error function calculates an error value between the sample image in the defect image repair data set and the reconstructed image corresponding to the sample image to generate the reference error value.

In one embodiment, the error function used to calculate the reference error value is the same as the preset error function as the loss function.

In one embodiment, when the loss function is the mean square deviation function, the electronic device 6 calculates the mean square deviation between the sample image in the defect image repair data set and the reconstructed image as the reference error value.

In one embodiment, when the loss function is cross entropy function, the electronic device 6 calculates the cross entropy between the sample image in the defect image repair data set and the reconstructed image as the reference error value.

In one embodiment, setting a threshold value based on the reference error value includes: calculating a statistical value of the reference error value, and determining the statistical value as the threshold value.

In one embodiment, the threshold is adjusted according to a preset recall rate or a preset accuracy rate. The preset accuracy rate is a proportion of the number of correctly detected defect sample images to the number of all detected defect sample images, and the preset recall rate is a proportion of the number of correctly detected defect sample images to the number of all real defect sample images.

For example, if the reference error values between the defect sample image in the defect image repair data set and the corresponding reconstructed image obey the Gaussian distribution, the 90% quantile value of the Gaussian distribution can be used as the threshold value to obtain a high accuracy rate.

In one embodiment, a maximum value of the reference error values of the flawless sample image in the defective image repair data set and the reconstructed image can be used as the threshold value to obtain a high recall rate.

In one embodiment, the minimum value of the reference error between the defect sample image in the defect image repair data set and the reconstruction error image can be used as the threshold value to obtain a high recall rate.

At block 14, inputting the image to be detected to the trained autoencoder after finishing training, and generating the reconstructed image corresponding to the image to be detected.

In one embodiment, the reconstructed image generated by the autoencoder after finishing the training is the flawless sample image.

In one embodiment, the electronic device 6 vectorizes the image to be detected to obtain the feature vector of the image to be detected, calculates the feature vector of the image to be detected by using the coding layer of the trained autoencoder to obtain the hidden vector of the image to be detected; calculates the hidden vector of the image to be detected by using the decoding layer of the trained autoencoder, and restores the calculated hidden vector to obtain the reconstructed image corresponding to the image to be detected.

At block 15, using the preset error function to calculate the reconstruction error between the image to be detected and the reconstructed image, and determining whether the image to be detected does have defects.

In one embodiment, determining that the image to be detected reveals defects when the reconstruction error is greater than the threshold value, or determining that the image to be detected reveals no flaws when the reconstruction error is less than or equal to the threshold value.

In one embodiment, the preset error function is the same as the preset error function as the loss function.

In one embodiment, when using the mean square deviation function as the loss function of the autoencoder to train the autoencoder, the electronic device 6 calculates the mean square deviation between the image to be detected and the reconstructed image by the loss function.

In one embodiment, when using the cross entropy function as the loss function to train the autoencoder, the electronic device calculates the cross entropy of the image to be detected and the reconstructed image by the loss function.

In one embodiment, by generating the artificial defect sample image to train the autoencoder, the flawless sample image can be reconstructed, and the threshold value can be adjusted according to the reference error value, so as to improve the accuracy of determination that the image reveals a defect.

Figure 2:
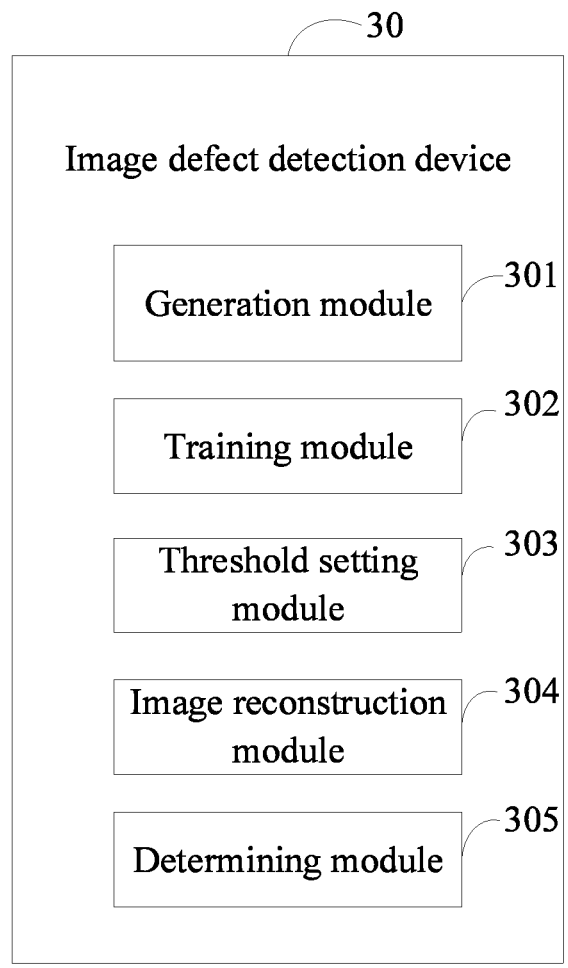
FIG. 2 is a block diagram of one embodiment of an image defect detection device.

FIG. 2 illustrates an image defect detection device 30. The image defect detection device 30 is applied in the electronic device 6. In one embodiment, according to the functions it performs, the image defect detection device 30 can be divided into a plurality of functional modules. The functional modules perform the blocks 11-15 in the embodiment of FIG. 1 to perform the functions of image defect detection.

In one embodiment, the image defect detection device 30 includes, but is not limited to, a generation module 301, a training module 302, a threshold setting module 303, an image reconstruction module 304, and a determining module 305. The modules 301-305 of the image defect detection device 30 can be collections of software instructions. In one embodiment, the program code of each program segment in the software instructions can be stored in a storage and executed by at least one processor to perform the required function.

The generation module 301 generates defect image repair data set.

In one embodiment, the generation module 301 establishes data set of images of flawless product samples, adds a random defect block generated by a preset method to a number of flawless sample images in the data set of images of flawless product samples to generate a number of artificial defect sample images, and generates the defect image repair data set based on pairs of the flawless sample images and the artificial defect sample images.

In one embodiment, the generation module 301 extracts the defect block from a collected original defect sample image, and randomly rotates the defect block, randomly zooms the defect block, and adds random Gaussian noise to the defect block to generate the random defect block.

In different embodiment, the flawless sample image and the original defect sample image can be obtained by different means, for example, by photographing.

In another embodiment, the generation module 301 generates a number of defect blocks having a random shape, a random position, a random size, a random gray value, or a random quantity, randomly rotates the defect blocks, randomly zooms the defect blocks, and adds random Gaussian noise to the defect blocks to generate the random defect blocks.

The training module 302 trains an autoencoder by inputting the defect image repair data set into the autoencoder.

In one embodiment, the training module 302 trains the autoencoder to learn to reconstruct images of the defect image repair data set, uses a preset error function as a loss function of the autoencoder, and minimizes the loss function to obtain the trained autoencoder.

In one embodiment, the autoencoder can be a denoising autoencoder, a sparse autoencoder, a compression autoencoder, a variational autoencoder, a stacking autoencoder, etc.

In one embodiment, the autoencoder includes an encoder and a decoder. In detail, the encoder includes at least one hidden layer, and the number of hidden layers can be arbitrarily set according to an application scenario of the autoencoder.

In one embodiment, the training module 302 trains the autoencoder to learn to reconstruct the flawless sample image when the image input in the autoencoder is the flawless sample image. When the image input in the autoencoder is an artificial defect sample image, the training module 302 trains the autoencoder to learn to reconstruct the flawless sample image corresponding to the artificial defect sample image.

In one embodiment, the training module 302 vectorizes the image to obtain a feature vector of the image, calculates the feature vector of the image by using a coding layer of the autoencoder to obtain a hidden vector of the image, uses a decoding layer of the autoencoder to calculate the hidden vector of the image, and restores the calculated hidden vector to obtain the reconstructed image corresponding to the image input into the autoencoder.

In one embodiment, minimizing the loss function of the autoencoder is the goal of optimizing the autoencoder.

In one embodiment, the loss function (namely the preset error function) can be a mean square deviation function or a cross entropy function.

In one embodiment, when the loss function is the mean square deviation function, the training module 302 minimizes the mean square deviation of the reconstructed image of the image input into the autoencoder and minimizes the mean square deviation of the flawless sample image corresponding to the image input into the autoencoder.

In one embodiment, the training module 302 minimizes the cross entropy of the reconstructed image of the image input in the autoencoder and minimizes the cross entropy of the flawless sample image corresponding to the image input into the autoencoder.

The threshold setting module 303 generates a reconstructed image corresponding to the sample image in the defect image repair data set by the autoencoder, calculates a reference error value between the sample image and the reconstructed image by the preset error function, and sets a threshold value based on the reference error value.

In one embodiment, by a preset error function, the threshold setting module 303 calculates an error value between the sample image in the defect image repair data set and the reconstructed image corresponding to the sample image to generate the reference error value.

In one embodiment, the error function used to calculate the reference error value is the same as the preset error function of the loss function.

In one embodiment, when the loss function is the mean square deviation function, the threshold setting module 303 calculates the mean square deviation between the sample image in the defect image repair data set and the reconstructed image as the reference error value.

In one embodiment, when the loss function is cross entropy function, the threshold setting module 303 calculates the cross entropy between the sample image in the defect image repair data set and the reconstructed image as the reference error value.

In one embodiment, the threshold setting module 303 calculates a statistical value of the reference error value, and determines the statistical value as the threshold value.

In one embodiment, the threshold is adjusted according to a preset recall rate or a preset accuracy rate. The preset accuracy rate is a proportion of the number of correctly detected defect sample images to the number of all detected defect sample images, and the preset recall rate is a proportion of the number of correctly detected defect sample images to the number of all real defect sample images.

For example, if the reference error values between the defect sample image in the defect image repair data set and the corresponding reconstructed image obey the Gaussian distribution, the 90% quantile value of the Gaussian distribution can be used as the threshold value to obtain a high accuracy rate.

In one embodiment, a maximum value of the reference error values of the flawless sample image in the defective image repair data set and the reconstructed image can be used as the threshold value to obtain a high recall rate.

In one embodiment, the minimum value of the reference error between the defect sample image in the defect image repair data set and the reconstruction error image can be used as the threshold value to obtain a high recall rate.

The image reconstruction module 304 inputs the image to be detected to the trained autoencoder after finishing the training process, and generates the reconstructed image corresponding to the image to be detected.

In one embodiment, the reconstructed image generated by the autoencoder after finishing the training is the flawless sample image.

In one embodiment, the image reconstruction module 304 vectorizes the image to be detected to obtain the feature vector of the image to be detected, calculates the feature vector of the image to be detected by using the coding layer of the trained autoencoder to obtain the hidden vector of the image to be detected, calculates the hidden vector of the image to be detected by using the decoding layer of the trained autoencoder, and restores the calculated hidden vector to obtain the reconstructed image corresponding to the image to be detected.

The determining module 305 uses the preset error function to calculate the reconstruction error between the image to be detected and the reconstructed image, and determines whether defects are revealed in the image to be detected.

In one embodiment, the determining module 305 determines that the image to be detected reveals defects when the reconstruction error is greater than the threshold value, or determines that the image to be detected reveals no defects when the reconstruction error is less than or equal to the threshold value.

In one embodiment, the preset error function is the same as the preset error function of the loss function.

In one embodiment, when using the mean square deviation function as the loss function of the autoencoder to train the autoencoder, the determining module 305 calculates the mean square deviation between the image to be detected and the reconstructed image by the loss function.

In one embodiment, when using the cross entropy function as the loss function to train the autoencoder, the determining module 305 calculates the cross entropy of the image to be detected and the reconstructed image by the loss function.

In one embodiment, by generating the artificial defect sample image to train the autoencoder, the flawless sample image can be reconstructed, and the threshold value can be adjusted according to the reference error value, so as to improve the accuracy of determination as to defects revealed in the image.

Figure 3:
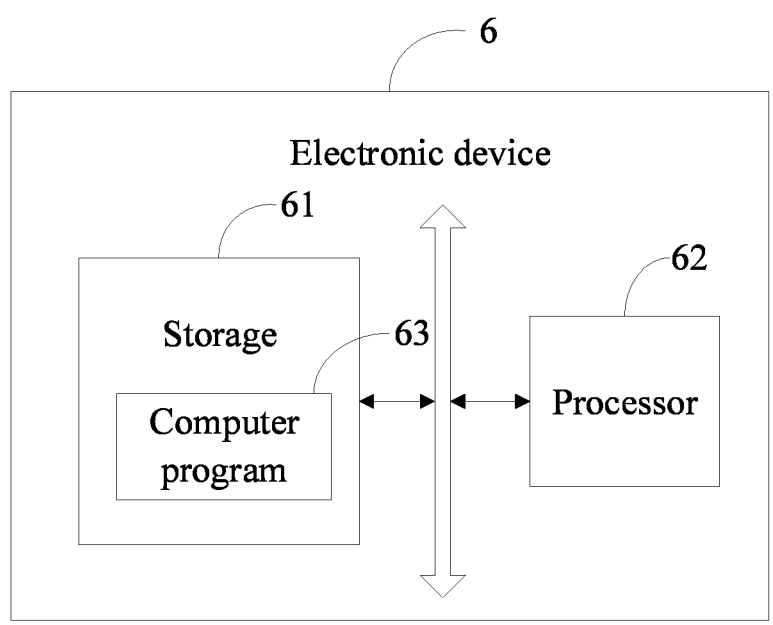
FIG. 3 is a schematic diagram of one embodiment of an electronic device.

FIG. 3 illustrates the electronic device 6. The electronic device 6 includes a storage 61, a processor 62, and a computer program 63 stored in the storage 61 and executed by the processor 62. When the processor 62 executes the computer program 63, the blocks in the embodiment of the image defect detection method are implemented, for example, blocks 11 to 15 as shown in FIG. 1. Alternatively, when the processor 62 executes the computer program 63, the functions of the modules in the embodiment of the image defect detection device are implemented, for example, modules 301-305 shown in FIG. 2.

In one embodiment, the computer program 63 can be partitioned into one or more modules/units that are stored in the memory 20 and executed by the processor 62. The one or more modules/units may be a series of computer program instruction segments capable of performing a particular function, and the instruction segments describe the execution of the computer program 63 in the electronic device 6. For example, the computer program 63 can be divided into the generation module 301, the training module 302, the threshold setting module 303, the image reconstruction module 304, and the determining module 305 as shown in FIG. 2.

In one embodiment, the electronic device 6 can be a computing device such as a desktop computer, a notebook, a handheld computer, and a cloud terminal device. FIG. 3 shows only one example of the electronic device 6. There are no limitations of the electronic device 6, and other examples may include more or less components than those illustrated, or some components may be combined, or may have a different arrangement. The components of the electronic device 6 may also include input devices, output devices, communication units, network access devices, buses, and the like.

The processor 62 can be a central processing unit (CPU), and also include other general-purpose processors, a digital signal processor (DSP), and application specific integrated circuit (ASIC), Field-Programmable Gate Array (FPGA) or other programmable logic device, discrete gate or transistor logic device, discrete hardware components, etc. The processor 62 may be a microprocessor or the processor may be any conventional processor or the like. The processor 62 is the control center of the electronic device 6, and connects the electronic device 6 by using various interfaces and lines. The storage 61 can be used to store the computer program 63, modules or units, and the processor 62 can realize various functions of the electronic device 6 by running or executing the computer program, modules, or units stored in the storage 61 and calling up the data stored in the storage 61.

In one embodiment, the storage 61 mainly includes a program storage area and a data storage area, wherein the program storage area may store an operating system, an application program (such as a sound playback function, an image playing function, etc.) required for at least one function, etc. The data storage area can store data (such as audio data, telephone book, etc.) created according to the use of electronic device 6. In addition, the storage 61 may include a random access memory, and may also include a non-volatile memory, such as a hard disk, an internal memory, a plug-in hard disk, a smart media card (SMC), a secure digital (SD) card, a flash card, at least one disk storage device, a flash memory device, or other volatile solid state storage device.

In one embodiment, the modules/units integrated in the electronic device 6 can be stored in a computer readable storage medium if such modules/units are implemented in the form of a product. Thus, the present disclosure may be implemented and realized in any part of the method of the foregoing embodiments, or may be implemented by the computer program, which may be stored in the computer readable storage medium. The steps of the various method embodiments described above may be implemented by a computer program when executed by a processor. The computer program includes computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM), random access memory (RAM), electrical carrier signals, telecommunication signals, and software distribution media.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. An image defect detection method comprising:
generating a defect image repair data set comprising sample images;
training an autoencoder according to the defect image repair data set, and obtaining a trained autoencoder, comprising:
training the autoencoder to learn to reconstruct images of the defect image repair data set; using a preset error function as a loss function of the autoencoder, and minimizing the loss function to obtain the trained autoencoder, comprising:
training the autoencoder to learn to reconstruct the flawless sample image when the image input in the autoencoder is the flawless sample image;
training the autoencoder to learn to reconstruct the flawless sample image corresponding to the artificial defect sample image when the image input in the autoencoder is an artificial defect sample image, comprising:
training the autoencoder to learn to reconstruct images of the plurality of artificial defect sample images;
using a cross entropy function as a loss function of the autoencoder, and minimizing a cross entropy between reconstructed images of the plurality of artificial defect sample images and the flawless sample images corresponding to the plurality of artificial defect sample images;
generating, by the trained autoencoder, a reconstructed image corresponding to a sample image in the defect image repair data set, calculating a reference error value between the sample image and the reconstructed image by invoking a preset error function, and setting a threshold value based on the reference error value;
inputting an image to be detected to the trained autoencoder, and generating the reconstructed image corresponding to the image to be detected;
calculating the reconstruction error between the image to be detected and the reconstructed image corresponding to the image to be detected, and determining whether the image to be detected does have defects;
determining that the image to be detected is a defective image when the reconstruction error is greater than the threshold value;
determining that the image to be detected is a flawless image when the reconstruction error is less than or equal to the threshold value.

2. The image defect detection method as recited in claim 1, further comprising:
vectorizing the image input in the autoencoder to obtain a feature vector of the image;
calculating the feature vector of the image by using a coding layer of the autoencoder, and obtaining a hidden vector of the image according to the feature vector of the image;
calculating the hidden vector of the image by a decoding layer of the autoencoder; and
restoring the calculated hidden vector to obtain the reconstructed image corresponding to the image input in the autoencoder.

3. The image defect detection method as recited in claim 1, further comprising:
calculating a statistical value of the reference error value, and determining the statistical value as the threshold value;
adjusting the threshold according to a preset recall rate or a preset accuracy rate, wherein,
the preset accuracy rate is a proportion of a number of correctly detected defect sample images to a number of all detected defect sample images, and the preset recall rate is a proportion of the number of correctly detected defect sample images to a number of all real defect sample images.

4. An electronic device comprising:
a processor; and
a non-transitory storage medium coupled to the processor and configured to store a plurality of instructions, which cause the processor to:
generate defect image repair data set comprising sample images;
training an autoencoder according to the defect image repair data set, and obtain a trained autoencoder comprising:
training the autoencoder to learn to reconstruct images of the defect image repair data set; using a preset error function as a loss function of the autoencoder, and minimizing the loss function to obtain the trained autoencoder, comprising:
training the autoencoder to learn to reconstruct the flawless sample image when the image input in the autoencoder is the flawless sample image; training the autoencoder to learn to reconstruct the flawless sample image corresponding to the artificial defect sample image when the image input in the autoencoder is an artificial defect sample image, comprising:
training the autoencoder to learn to reconstruct images of the plurality of artificial defect sample images; using a cross entropy function as a loss function of the autoencoder, and minimizing a cross entropy between reconstructed images of the plurality of artificial defect sample images and the flawless sample images corresponding to the plurality of artificial defect sample images;
generate a reconstructed image corresponding to the sample image in the defect image repair data set by the trained autoencoder, calculate a reference error value between the sample image and the reconstructed image by a preset error function, and set a threshold value based on the reference error value;
input an image to be detected to the trained autoencoder after finishing training, and generate the reconstructed image corresponding to the image to be detected;
use the preset error function to calculate the reconstruction error between the image to be detected and the reconstructed image corresponding to the image to be detected, and determine whether the image to be detected does have defects;
determine that the image to be detected is a defective image when the reconstruction error is greater than the threshold value;
determine that the image to be detected is a flawless image when the reconstruction error is less than or equal to the threshold value.

5. The electronic device as recited in claim 4, wherein the plurality of instructions are further configured to cause the processor to:
vectorize the image input in the autoencoder to obtain a feature vector of the image;

calculate the feature vector of the image by using a coding layer of the autoencoder, and obtain a hidden vector of the image according to the feature vector of the image;

calculate the hidden vector of the image by a decoding layer of the autoencoder; and restore the calculated hidden vector to obtain the reconstructed image corresponding to the image input in the autoencoder.

6. The electronic device as recited in claim 4, wherein the plurality of instructions are further configured to cause the processor to:

calculate a statistical value of the reference error value, and determine the statistical value as the threshold value;

adjust the threshold according to a preset recall rate or a preset accuracy rate, wherein the preset accuracy rate is a proportion of a number of correctly detected defect sample images to a number of all detected defect sample images, and the preset recall rate is a proportion of the number of correctly detected defect sample images to a number of all real defect sample images.

7. A non-transitory storage medium having stored thereon instructions that, when executed by at least one processor of an electronic device, causes the least one processor to execute instructions of an image defect detection method, the method comprising:

generating defect image repair data set comprising sample images;

training an autoencoder according to the defect image repair data set, and obtaining a trained autoencoder, comprising: training the autoencoder to learn to reconstruct images of the defect image repair data set; using a preset error function as a loss function of the autoencoder, and minimizing the loss function to obtain the trained autoencoder, comprising:

training the autoencoder to learn to reconstruct the flawless sample image when the image input in the autoencoder is the flawless sample image;

training the autoencoder to learn to reconstruct the flawless sample image corresponding to the artificial defect sample image when the image input in the autoencoder is an artificial defect sample image, comprising:

training the autoencoder to learn to reconstruct images of the plurality of artificial defect sample images;

using a cross entropy function as a loss function of the autoencoder, and minimizing a cross entropy between reconstructed images of the plurality of artificial defect sample images and the flawless sample images corresponding to the plurality of artificial defect sample images;

generating, by the trained autoencoder, a reconstructed image corresponding to the sample image in the defect image repair data set, calculating a reference error value between the sample image and the reconstructed image by a preset error function, and setting a threshold value based on the reference error value;

inputting an image to be detected to the trained autoencoder after finishing training, and generating the reconstructed image corresponding to the image to be detected;

using the preset error function to calculate the reconstruction error between the image to be detected and the reconstructed image corresponding to the image to be detected, and determining whether the image to be detected does have defects;

determining that the image to be detected is a defective image when the reconstruction error is greater than the threshold value;

determining that the image to be detected is a flawless image when the reconstruction error is less than or equal to the threshold value.

8. The non-transitory storage medium as recited in claim 7, wherein the image defect detection method comprising:

vectorizing the image input in the autoencoder to obtain a feature vector of the image;

calculating the feature vector of the image by using a coding layer of the autoencoder, and obtaining a hidden vector of the image according to the feature vector of the image;

calculating the hidden vector of the image by a decoding layer of the autoencoder; and restoring the calculated hidden vector to obtain the reconstructed image corresponding to the image input in the autoencoder.

* * * * *